United States Patent
Church

(10) Patent No.: US 10,931,662 B1
(45) Date of Patent: Feb. 23, 2021

(54) METHODS FOR EPHEMERAL AUTHENTICATION SCREENING AND DEVICES THEREOF

(71) Applicant: F5 Networks, Inc., Seattle, WA (US)

(72) Inventor: William Church, Seattle, WA (US)

(73) Assignee: F5 NETWORKS, INC., Seattle, WA (US)

( * ) Notice: Subject to any disclaimer, the term of this patent is extended or adjusted under 35 U.S.C. 154(b) by 266 days.

(21) Appl. No.: 15/803,914

(22) Filed: Nov. 6, 2017

Related U.S. Application Data

(60) Provisional application No. 62/483,582, filed on Apr. 10, 2017.

(51) Int. Cl.
  *H04L 29/06* (2006.01)
  *H04L 29/08* (2006.01)
  (Continued)

(52) U.S. Cl.
  CPC .......... *H04L 63/083* (2013.01); *H04L 9/0894* (2013.01); *H04L 9/32* (2013.01);
  (Continued)

(58) Field of Classification Search
  CPC . H04L 63/0823; H04L 63/0281; H04L 63/20; H04L 63/0815; H04L 63/10; H04L 63/08; H04L 63/083; H04L 63/0884; H04L 9/3263; H04L 67/327; H04L 67/2819; H04L 67/14; H04L 2209/76; H04L 41/28;
  (Continued)

(56) References Cited

U.S. PATENT DOCUMENTS 3,950,735 A    4/1976  Patel
4,644,532 A    2/1987  George et al.
(Continued)

FOREIGN PATENT DOCUMENTS

EP    0744850 A2   11/1996
WO   WO 91/14326    9/1991
(Continued)

OTHER PUBLICATIONS

Stallings (1995). Network and internetwork security: principles and practice. ISBN 0-02-415483-0. pp. 22-23. (Year: 1995).*
(Continued)

*Primary Examiner* — Brian F Shaw
(74) *Attorney, Agent, or Firm* — Troutman Pepper Hamilton Sanders LLP (Rochester)

(57) ABSTRACT

Methods, non-transitory computer readable media, network traffic management apparatuses, and network traffic management systems that receive a directory service authentication request from an application. The directory service authentication request comprising a first password. The first password is compared to a stored second password received from a previously-authenticated client to determine when there is a match. A positive authentication result is returned to the application in response to the directory service authentication request, when the determining indicates that there is a match. This technology advantageously facilitates client certificate authentication for applications that only support password-based login.

20 Claims, 5 Drawing Sheets

(51) Int. Cl.
*H04L 9/32* (2006.01)
*H04L 9/08* (2006.01)

(52) U.S. Cl.
CPC ...... *H04L 63/0428* (2013.01); *H04L 63/0823* (2013.01); *H04L 67/10* (2013.01)

(58) Field of Classification Search
CPC .......... G06F 21/44; G06F 21/31; G06F 21/33; G06F 21/41; G06F 2221/2149; G06F 2221/2137; G06F 2209/542; H04W 12/06; H04W 12/0027; H04W 12/08
See application file for complete search history.

(56) References Cited

U.S. PATENT DOCUMENTS

| | | | |
|---|---|---|---|
| 4,897,781 A | 1/1990 | Chang et al. |
| 4,965,772 A | 10/1990 | Daniel et al. |
| 5,023,826 A | 6/1991 | Patel |
| 5,053,953 A | 10/1991 | Patel |
| 5,299,312 A | 3/1994 | Rocco, Jr. |
| 5,327,529 A | 7/1994 | Fults et al. |
| 5,367,635 A | 11/1994 | Bauer et al. |
| 5,371,852 A | 12/1994 | Attanasio et al. |
| 5,406,502 A | 4/1995 | Haramaty et al. |
| 5,475,857 A | 12/1995 | Dally |
| 5,517,617 A | 5/1996 | Sathaye et al. |
| 5,519,694 A | 5/1996 | Brewer et al. |
| 5,519,778 A | 5/1996 | Leighton et al. |
| 5,521,591 A | 5/1996 | Arora et al. |
| 5,528,701 A | 6/1996 | Aref |
| 5,581,764 A | 12/1996 | Fitzgerald et al. |
| 5,596,742 A | 1/1997 | Agarwal et al. |
| 5,606,665 A | 2/1997 | Yang et al. |
| 5,611,049 A | 3/1997 | Pitts |
| 5,663,018 A | 9/1997 | Cummings et al. |
| 5,752,023 A | 5/1998 | Choucri et al. |
| 5,761,484 A | 6/1998 | Agarwal et al. |
| 5,768,423 A | 6/1998 | Aref et al. |
| 5,774,660 A | 6/1998 | Brendel et al. |
| 5,790,554 A | 8/1998 | Pitcher et al. |
| 5,802,052 A | 9/1998 | Venkataraman |
| 5,812,550 A | 9/1998 | Sohn et al. |
| 5,825,772 A | 10/1998 | Dobbins et al. |
| 5,875,296 A | 2/1999 | Shi et al. |
| 5,892,914 A | 4/1999 | Pitts |
| 5,892,932 A | 4/1999 | Kim |
| 5,919,247 A | 7/1999 | Van Hoff et al. |
| 5,936,939 A | 8/1999 | Des Jardins et al. |
| 5,941,988 A | 8/1999 | Bhagwat et al. |
| 5,946,690 A | 8/1999 | Pitts |
| 5,949,885 A | 9/1999 | Leighton |
| 5,951,694 A | 9/1999 | Choquier et al. |
| 5,959,990 A | 9/1999 | Frantz et al. |
| 5,974,460 A | 10/1999 | Maddalozzo, Jr. et al. |
| 5,983,281 A | 11/1999 | Ogle et al. |
| 5,988,847 A | 11/1999 | McLaughlin et al. |
| 6,006,260 A | 12/1999 | Barrick, Jr. et al. |
| 6,006,264 A | 12/1999 | Colby et al. |
| 6,026,452 A | 2/2000 | Pitts |
| 6,028,857 A | 2/2000 | Poor |
| 6,051,169 A | 4/2000 | Brown et al. |
| 6,078,956 A | 6/2000 | Bryant et al. |
| 6,085,234 A | 7/2000 | Pitts et al. |
| 6,085,320 A | 7/2000 | Kaliski, Jr. |
| 6,092,196 A | 7/2000 | Reiche |
| 6,108,703 A | 8/2000 | Leighton et al. |
| 6,111,876 A | 8/2000 | Frantz et al. |
| 6,128,279 A | 10/2000 | O'Neil et al. |
| 6,128,657 A | 10/2000 | Okanoya et al. |
| 6,170,022 B1 | 1/2001 | Linville et al. |
| 6,178,423 B1 | 1/2001 | Douceur et al. |
| 6,182,139 B1 | 1/2001 | Brendel |
| 6,192,051 B1 | 2/2001 | Lipman et al. |
| 6,223,287 B1 | 4/2001 | Douglas et al. |
| 6,233,612 B1 | 5/2001 | Fruchtman et al. |
| 6,246,684 B1 | 6/2001 | Chapman et al. |
| 6,253,226 B1 | 6/2001 | Chidambaran et al. |
| 6,253,230 B1 | 6/2001 | Couland et al. |
| 6,263,368 B1 | 7/2001 | Martin |
| 6,289,012 B1 | 9/2001 | Harrington et al. |
| 6,298,380 B1 | 10/2001 | Coile et al. |
| 6,327,622 B1 | 12/2001 | Jindal et al. |
| 6,343,324 B1 | 1/2002 | Hubis et al. |
| 6,347,339 B1 | 2/2002 | Morris et al. |
| 6,360,270 B1 | 3/2002 | Cherkasova et al. |
| 6,374,300 B2 | 4/2002 | Masters |
| 6,396,833 B1 | 5/2002 | Zhang et al. |
| 6,430,562 B1 | 8/2002 | Kardos et al. |
| 6,434,081 B1 | 8/2002 | Johnson et al. |
| 6,484,261 B1 | 11/2002 | Wiegel |
| 6,490,624 B1 | 12/2002 | Sampson et al. |
| 6,510,135 B1 | 1/2003 | Almulhem et al. |
| 6,510,458 B1 | 1/2003 | Berstis et al. |
| 6,519,643 B1 | 2/2003 | Foulkes et al. |
| 6,535,912 B1 | 3/2003 | Anupam et al. |
| 6,601,084 B1 | 7/2003 | Bhaskaran et al. |
| 6,636,503 B1 | 10/2003 | Shiran et al. |
| 6,636,894 B1 | 10/2003 | Short et al. |
| 6,650,640 B1 | 11/2003 | Muller et al. |
| 6,650,641 B1 | 11/2003 | Albert et al. |
| 6,654,701 B2 | 11/2003 | Hatley |
| 6,683,873 B1 | 1/2004 | Kwok et al. |
| 6,691,165 B1 | 2/2004 | Bruck et al. |
| 6,708,187 B1 | 3/2004 | Shanumgam et al. |
| 6,742,045 B1 | 5/2004 | Albert et al. |
| 6,751,663 B1 | 6/2004 | Farrell et al. |
| 6,754,228 B1 | 6/2004 | Ludwig |
| 6,760,775 B1 | 7/2004 | Anerousis et al. |
| 6,772,219 B1 | 8/2004 | Shobatake |
| 6,779,039 B1 | 8/2004 | Bommareddy et al. |
| 6,781,986 B1 | 8/2004 | Sabaa et al. |
| 6,798,777 B1 | 9/2004 | Ferguson et al. |
| 6,816,901 B1 | 11/2004 | Sitaraman et al. |
| 6,829,238 B2 | 12/2004 | Tokuyo et al. |
| 6,868,082 B1 | 3/2005 | Allen, Jr. et al. |
| 6,876,629 B2 | 4/2005 | Beshai et al. |
| 6,876,654 B1 | 4/2005 | Hegde |
| 6,888,836 B1 | 5/2005 | Cherkasova |
| 6,928,082 B2 | 8/2005 | Liu et al. |
| 6,934,848 B1 * | 8/2005 | King ...................... G06F 21/33 705/65 |
| 6,950,434 B1 | 9/2005 | Viswanath et al. |
| 6,954,780 B2 | 10/2005 | Susai et al. |
| 6,957,272 B2 | 10/2005 | Tallegas et al. |
| 6,975,592 B1 | 12/2005 | Seddigh et al. |
| 6,976,164 B1 * | 12/2005 | King ................... G06Q 20/202 705/21 |
| 6,987,763 B2 | 1/2006 | Rochberger et al. |
| 7,007,092 B2 | 2/2006 | Peiffer |
| 7,113,993 B1 | 9/2006 | Cappiello et al. |
| 7,139,792 B1 | 11/2006 | Mishra et al. |
| 7,228,422 B2 | 6/2007 | Morioka et al. |
| 7,287,082 B1 | 10/2007 | O'Toole, Jr. |
| 7,308,703 B2 | 12/2007 | Wright et al. |
| 7,321,926 B1 | 1/2008 | Zhang et al. |
| 7,333,999 B1 | 2/2008 | Njemanze |
| 7,343,413 B2 | 3/2008 | Gilde et al. |
| 7,349,391 B2 | 3/2008 | Ben-Dor et al. |
| 7,454,480 B2 | 11/2008 | Labio et al. |
| 7,490,162 B1 | 2/2009 | Masters |
| 7,500,269 B2 | 3/2009 | Huotari et al. |
| 7,526,541 B2 | 4/2009 | Roese et al. |
| 7,552,199 B2 | 6/2009 | Pomerantz |
| 7,558,197 B1 | 7/2009 | Sindhu et al. |
| 7,624,424 B2 | 11/2009 | Morita et al. |
| 7,757,278 B2 | 7/2010 | Boneh et al. |
| 7,788,730 B2 | 8/2010 | Dean et al. |
| 7,801,978 B1 | 9/2010 | Susai et al. |
| 7,857,002 B2 | 12/2010 | Reck |
| 7,916,728 B1 | 3/2011 | Mimms |
| 7,945,563 B2 | 5/2011 | Seitz |
| 7,966,553 B2 | 6/2011 | Iverson |
| 8,090,816 B1 | 1/2012 | Deshmukh et al. |

(56) References Cited

U.S. PATENT DOCUMENTS

| | | |
|---|---|---|
| 8,103,809 B1 | 1/2012 | Michels et al. |
| 8,112,491 B1 | 2/2012 | Michels et al. |
| 8,112,799 B1 | 2/2012 | Loiodice et al. |
| 8,130,650 B2 | 3/2012 | Allen, Jr. et al. |
| 8,234,687 B2 | 7/2012 | Baumhof |
| 8,291,497 B1 | 10/2012 | Griffin et al. |
| 8,301,837 B1 | 10/2012 | Natarajan |
| 8,306,036 B1 | 11/2012 | Bollay |
| 8,346,993 B2 | 1/2013 | Michels et al. |
| 8,347,100 B1 | 1/2013 | Thornewell et al. |
| 8,356,352 B1 | 1/2013 | Wawda et al. |
| 8,447,884 B1 | 5/2013 | Baumann |
| 8,537,825 B1 | 9/2013 | Mimms |
| 8,554,999 B2 | 10/2013 | Natarajan |
| 8,578,482 B1 | 11/2013 | Yang et al. |
| 8,584,233 B1 | 11/2013 | Yang et al. |
| 8,601,586 B1 | 12/2013 | Boutros et al. |
| 8,769,681 B1 | 7/2014 | Michels et al. |
| 8,776,166 B1 | 7/2014 | Erickson |
| 8,856,898 B1 | 10/2014 | Thornewell et al. |
| 8,880,632 B1 | 11/2014 | Michels |
| 8,880,696 B1 | 11/2014 | Michels |
| 8,886,981 B1 | 11/2014 | Baumann et al. |
| 8,984,178 B2 | 3/2015 | Michels et al. |
| 9,020,912 B1 | 4/2015 | Majee et al. |
| 9,083,760 B1 | 7/2015 | Hughes et al. |
| 9,106,699 B2 | 8/2015 | Thornewell et al. |
| 9,141,625 B1 | 9/2015 | Thornewell et al. |
| 9,154,453 B2 | 10/2015 | Michels et al. |
| 9,231,879 B1 | 1/2016 | Wojcik |
| 9,246,819 B1 | 1/2016 | Thirasuttakorn |
| 9,294,502 B1 | 3/2016 | Benishti |
| 9,313,047 B2 | 4/2016 | Michels et al. |
| 9,444,839 B1 | 9/2016 | Faulkner et al. |
| 2001/0023442 A1 | 9/2001 | Masters |
| 2002/0059428 A1 | 5/2002 | Susai et al. |
| 2002/0161913 A1 | 10/2002 | Gonzalez et al. |
| 2002/0198993 A1 | 12/2002 | Cudd et al. |
| 2003/0046291 A1 | 3/2003 | Fascenda |
| 2003/0086415 A1 | 5/2003 | Bernhard et al. |
| 2003/0108052 A1 | 6/2003 | Inoue et al. |
| 2003/0145062 A1 | 7/2003 | Sharma et al. |
| 2003/0208562 A1 | 11/2003 | Hauck et al. |
| 2003/0225485 A1 | 12/2003 | Fritz et al. |
| 2004/0267920 A1 | 12/2004 | Hydrie et al. |
| 2004/0268358 A1 | 12/2004 | Darling et al. |
| 2005/0004887 A1 | 1/2005 | Igakura et al. |
| 2005/0052440 A1 | 3/2005 | Kim et al. |
| 2005/0055435 A1 | 3/2005 | Gbadegesin et al. |
| 2005/0071687 A1* | 3/2005 | Pathakis ............ H04L 63/0407 726/19 |
| 2005/0122977 A1 | 6/2005 | Lieberman |
| 2005/0144441 A1 | 6/2005 | Govindarajan |
| 2005/0154837 A1 | 7/2005 | Keohane et al. |
| 2005/0187866 A1 | 8/2005 | Lee |
| 2005/0188051 A1 | 8/2005 | Sneh |
| 2006/0005017 A1 | 1/2006 | Black et al. |
| 2006/0059267 A1 | 3/2006 | Cugi et al. |
| 2006/0075028 A1 | 4/2006 | Zager et al. |
| 2006/0156416 A1 | 7/2006 | Huotari et al. |
| 2006/0161577 A1 | 7/2006 | Kulkarni et al. |
| 2006/0171365 A1 | 8/2006 | Borella |
| 2006/0233106 A1 | 10/2006 | Achlioptas et al. |
| 2006/0242300 A1 | 10/2006 | Yumoto et al. |
| 2006/0253581 A1 | 11/2006 | Dixon et al. |
| 2006/0259967 A1 | 11/2006 | Thomas et al. |
| 2007/0005984 A1 | 1/2007 | Florencio et al. |
| 2007/0016662 A1 | 1/2007 | Desai et al. |
| 2007/0016949 A1 | 1/2007 | Dunagan et al. |
| 2007/0039038 A1 | 2/2007 | Goodman et al. |
| 2007/0039050 A1 | 2/2007 | Aksenov et al. |
| 2007/0064661 A1 | 3/2007 | Sood et al. |
| 2007/0074169 A1 | 3/2007 | Chess et al. |
| 2007/0083646 A1 | 4/2007 | Miller et al. |
| 2007/0107048 A1 | 5/2007 | Halls et al. |
| 2007/0118879 A1 | 5/2007 | Yeun |
| 2007/0143851 A1 | 6/2007 | Nicodemus |
| 2007/0156592 A1 | 7/2007 | Henderson |
| 2007/0169191 A1 | 7/2007 | Greene et al. |
| 2007/0174491 A1 | 7/2007 | Still et al. |
| 2007/0255953 A1 | 11/2007 | Peyret |
| 2007/0297551 A1 | 12/2007 | Choi |
| 2008/0010377 A1 | 1/2008 | Nissennboim |
| 2008/0034136 A1 | 2/2008 | Ulenas |
| 2008/0092242 A1 | 4/2008 | Rowley |
| 2008/0133518 A1 | 6/2008 | Kapoor et al. |
| 2008/0134311 A1 | 6/2008 | Medvinsky et al. |
| 2008/0148340 A1 | 6/2008 | Powell et al. |
| 2008/0201599 A1 | 8/2008 | Ferraiolo et al. |
| 2008/0208957 A1 | 8/2008 | Ding |
| 2008/0229427 A1 | 9/2008 | Ramirez |
| 2008/0244724 A1 | 10/2008 | Choe |
| 2008/0256224 A1 | 10/2008 | Kaji et al. |
| 2008/0281983 A1 | 11/2008 | Cooley et al. |
| 2008/0289047 A1 | 11/2008 | Benea et al. |
| 2008/0301760 A1 | 12/2008 | Lim |
| 2008/0320567 A1 | 12/2008 | Shulman et al. |
| 2009/0049230 A1 | 2/2009 | Pandya |
| 2009/0064337 A1 | 3/2009 | Chien |
| 2009/0077383 A1 | 3/2009 | de Monseignat et al. |
| 2009/0119769 A1 | 5/2009 | Ross et al. |
| 2009/0125625 A1 | 5/2009 | Shim et al. |
| 2009/0138749 A1 | 5/2009 | Moll et al. |
| 2009/0138937 A1 | 5/2009 | Erlingsson et al. |
| 2009/0141891 A1 | 6/2009 | Boyen et al. |
| 2009/0172396 A1 | 7/2009 | Gabel et al. |
| 2009/0182818 A1 | 7/2009 | Krywaniuk |
| 2009/0228956 A1 | 9/2009 | He et al. |
| 2009/0287935 A1 | 11/2009 | Aull et al. |
| 2009/0300749 A1 | 12/2009 | Liske |
| 2009/0319769 A1 | 12/2009 | Betouin et al. |
| 2010/0017880 A1 | 1/2010 | Masood |
| 2010/0023582 A1 | 1/2010 | Pedersen et al. |
| 2010/0100725 A1 | 4/2010 | Ozzie |
| 2010/0106767 A1 | 4/2010 | Livshits et al. |
| 2010/0107247 A1 | 4/2010 | Shani |
| 2010/0122091 A1 | 5/2010 | Huang et al. |
| 2010/0150154 A1 | 6/2010 | Viger et al. |
| 2010/0229223 A1 | 9/2010 | Shepard |
| 2010/0251330 A1 | 9/2010 | Kroeselberg et al. |
| 2010/0257354 A1 | 10/2010 | Johnston et al. |
| 2010/0263035 A1* | 10/2010 | Tock ................ G06F 21/33 726/7 |
| 2010/0275014 A1 | 10/2010 | Kelley |
| 2010/0275024 A1 | 10/2010 | Abdulhayoglu |
| 2010/0281536 A1 | 11/2010 | Richards et al. |
| 2010/0281563 A1 | 11/2010 | Richards et al. |
| 2010/0313266 A1 | 12/2010 | Feng |
| 2010/0325277 A1 | 12/2010 | Muthiah et al. |
| 2010/0333167 A1 | 12/2010 | Luo et al. |
| 2011/0047620 A1 | 2/2011 | Mahaffey et al. |
| 2011/0066718 A1 | 3/2011 | Susai et al. |
| 2011/0173295 A1 | 7/2011 | Bakke et al. |
| 2011/0282997 A1 | 11/2011 | Prince |
| 2011/0321122 A1 | 12/2011 | Mwangi et al. |
| 2012/0174196 A1 | 7/2012 | Bhogavilli |
| 2013/0212240 A1 | 8/2013 | Thornewell et al. |
| 2013/0254848 A1* | 9/2013 | Ge ................ G06F 21/335 726/4 |
| 2015/0052252 A1 | 2/2015 | Gilde et al. |
| 2015/0096020 A1 | 4/2015 | Adams |
| 2015/0121060 A1 | 4/2015 | Mimms et al. |

FOREIGN PATENT DOCUMENTS

| | | |
|---|---|---|
| WO | WO 95/05712 | 2/1995 |
| WO | WO 97/09805 | 3/1997 |
| WO | WO 97/45800 | 12/1997 |
| WO | WO 99/05829 | 2/1999 |
| WO | WO 99/06913 | 2/1999 |
| WO | WO 99/10858 | 3/1999 |
| WO | WO 99/39373 | 8/1999 |

(56) References Cited

FOREIGN PATENT DOCUMENTS

| WO | WO 99/64967 | 12/1999 |
|---|---|---|
| WO | WO 00/04422 | 1/2000 |
| WO | WO 00/04458 | 1/2000 |

OTHER PUBLICATIONS

F5 Networks Inc., "BIG-IP APM 12.1.2", Release Notes, Apr. 20, 2017, 10 pages, vol. 12.1.2, F5 Networks, Inc., Retrieved from the Internet<https://support.f5.com/kb/en-us/products/big-ip_apm/releasenotes/product/relnote-apm-12-1-2.html>.

F5 Networks Inc., "BIG-IP® Access Policy Manager®: Authentication and Single Sign-On", Manual, May 9, 2016, pp. 1-332, vol. 12.1, F5 Networks, Inc.

F5 Networks Inc., "BIG-IP® Access Policy Manager®: Application Access", Manual, May 9, 2016, pp. 1-66, vol. 12.1, F5 Networks, Inc.

F5 Networks Inc., "BIG-IP® Access Policy Manager®: Network Access", Manual, Oct. 27, 2017, pp. 1-108, vol. 12.1, F5 Networks, Inc.

F5 Networks Inc., "BIG-IP® Local Traffic Management: Basics", Manual, May 9, 2016, pp. 1-58, vol. 12.1, F5 Networks, Inc.

F5 Networks Inc., "F5 BIG-IP Access Policy Management Operations Guide", Manual, Sep. 2017, pp. 1-176, F5 Networks, Inc.

F5 Networks Inc., "BIG-IP® Access Policy Manager®: Implementations", Manual, May 9, 2016, pp. 1-168, F5 Networks, Inc.

"A Process for Selective Routing of Servlet Content to Transcoding Modules," Research Disclosure 422124, Jun. 1999, pp. 889-890, IBM Corporation.

"BIG-IP Controller with Exclusive OneConnect Content Switching Feature Provides a Breakthrough System for Maximizing Server and Network Performance," F5 Networks, Inc. Press Release, May 8, 2001, 2 pages, Las Vegas, Nevada.

"Servlet/Applet/HTML authentication process with single sign-on," Research Disclosure 429128, Jan. 2000, pp. 163-164, IBM Corporation.

"Traffic Surges; Surge Queue; Netscaler Defense," 2005, PowerPoint Presentation, slides 1-12, Citrix Systems, Inc.

"Windows Server 2003 Kerberos Extensions," Microsoft TechNet, 2003 (Updated Jul. 31, 2004), http://technet.microsoft.com/en-us/library/cc738207, Microsoft Corporation.

Abad, Cristina L., and Rafael I. Bonilla. "An analuysis on the schemes for detecting and preventing ARP cache poisoning attacks." Distributed Computing System Workshops, 2007. ICDCSW'07. 27th International Conference on. IEEE, 2007.

ColonelPanic: Browser plugins vs extension—the difference, retrieved from http://colonelpanic.net/2010/08/browser-plugins-vs-extensions-the-difference.

Crescendo Networks, "Application Layer Processing (ALP)," 2003-2009, pp. 168-186, Chapter 9, CN-5000E/5500E, Foxit Software Company.

Dhamija et al: "The battle against phishing: dynamic secuirty skinds"—Symposium on Usable Privacy and Security, (SOUPS), Jul. 6-8, 2005, Pittsburgh, PA. USA.

F5 Networks Inc., "Configuration Guide for Local Traffic Management," F5 Networks Inc., Jan. 2006, version 9.2.2, 406 pgs.

Fielding et al., "Hypertext Transfer Protocol—HTTP/1.1," Network Working Group, RFC: 2068, Jan. 1997, pp. 1-162.

Fielding et al., "Hypertext Transfer Protocol—HTTP/1.1," Network Working Group, RFC: 2616, Jun. 1999, pp. 1-176, The Internet Society.

Floyd et al., "Random Early Detection Gateways for Congestion Avoidance," Aug. 1993, pp. 1-22, IEEE/ACM Transactions on Networking, California.

Hochmuth, Phil, "F5, CacheFlow pump up content-delivery lines," Network World Fusion, May 4, 2001, 1 page, Las Vegas, Nevada.

Kevin Borders, Atul Prakash: "Web Tap: detecting covert web traffic"—Proceeding of the 11th ACM conference on Computer and Communications Security CCS'04, pp. 110-120, New York, 2004.

Macvittie, Lori, "Message-Based Load Balancing," Technical Brief, Jan. 2010, pp. 1-9, F5 Networks, Inc.

Mehra et al. Mitigating Denial of Service attack using CAPCHA Mechanism, 2011.

Schaefer, Ken, "IIS and Kerberos Part 5—Protocol Transition, Constrained Delegation, S4U2S and S4U2P," Jul. 18, 2007, 21 pages, http://www.adopenstatic.com/cs/blogs/ken/archive/2007/07/19/8460.aspx.

Williams et al., "The Ultimate Windows Server 2003 System Administrator's Guide: Forwarding Authentication," 2003, 2 pages, Figure 10.7, Addison-Wesley Professional, Boston, Massachusetts.

\* cited by examiner

METHODS FOR EPHEMERAL AUTHENTICATION SCREENING AND DEVICES THEREOF

This application claims the benefit of U.S. Provisional Patent Application Ser. No. 62/483,582 filed Apr. 10, 2017, which is hereby incorporated by reference in its entirety.

FIELD

This technology generally relates to network and application security and, more particularly, to client authentication.

BACKGROUND

Policies in many networks restrict the use of passwords as a login method. However, such networks often have legacy or other applications that require passwords for password-based authentications and are not capable of performing other types of authentication, such as client certificate authentication. Application servers hosting such applications generally utilize a directory service in order to authenticate users based on received passwords or other credentials.

Many networks include intermediary devices, such as network traffic management devices, that are disposed between client devices and application servers in order to manage (e.g., balance or accelerate) the network traffic exchanged between those devices. While network traffic management apparatuses can terminate Transport Layer Security (TLS) sessions and facilitate client certificate authentication, there is currently no way for network traffic management apparatuses to act as authentication proxies for application servers in a network, including application servers hosting application that require password-based authentication.

SUMMARY

A method for ephemeral authentication screening implemented by a network traffic management system comprising one or more network traffic management apparatuses, application servers, directory service apparatuses, or client devices, the method including receiving a directory service authentication request from an application. The directory service authentication request comprising a first password. The first password is compared to a stored second password received from a previously-authenticated client to determine when there is a match. A positive authentication result is returned to the application in response to the directory service authentication request, when the determining indicates that there is a match.

A network traffic management apparatus, comprising memory comprising programmed instructions stored thereon and one or more processors configured to be capable of executing the stored programmed instructions to receive a directory service authentication request from an application. The directory service authentication request comprising a first password. The first password is compared to a stored second password received from a previously-authenticated client to determine when there is a match. A positive authentication result is returned to the application in response to the directory service authentication request, when the determining indicates that there is a match.

A non-transitory computer readable medium having stored thereon instructions for ephemeral authentication screening comprising executable code which when executed by one or more processors, causes the processors to receive a directory service authentication request from an application. The directory service authentication request comprising a first password. The first password is compared to a stored second password received from a previously-authenticated client to determine when there is a match. A positive authentication result is returned to the application in response to the directory service authentication request, when the determining indicates that there is a match.

A network traffic management system, comprising one or more network traffic management apparatuses, application servers, directory service apparatuses, or client devices, the network traffic management system comprising memory comprising programmed instructions stored thereon and one or more processors configured to be capable of executing the stored programmed instructions to receive a directory service authentication request from an application. The directory service authentication request comprising a first password. The first password is compared to a stored second password received from a previously-authenticated client to determine when there is a match. A positive authentication result is returned to the application in response to the directory service authentication request, when the determining indicates that there is a match.

This technology has a number of associated advantages including providing methods, non-transitory computer readable media, network traffic management apparatuses, and network traffic management systems that authenticate clients on behalf of applications that require password-based authentication but reside in networks that restrict password use. With this technology, client access to legacy and other applications that require password-based authentication can advantageously be maintained in networks that have policies against such authentication.

DETAILED DESCRIPTION

Figure 1:
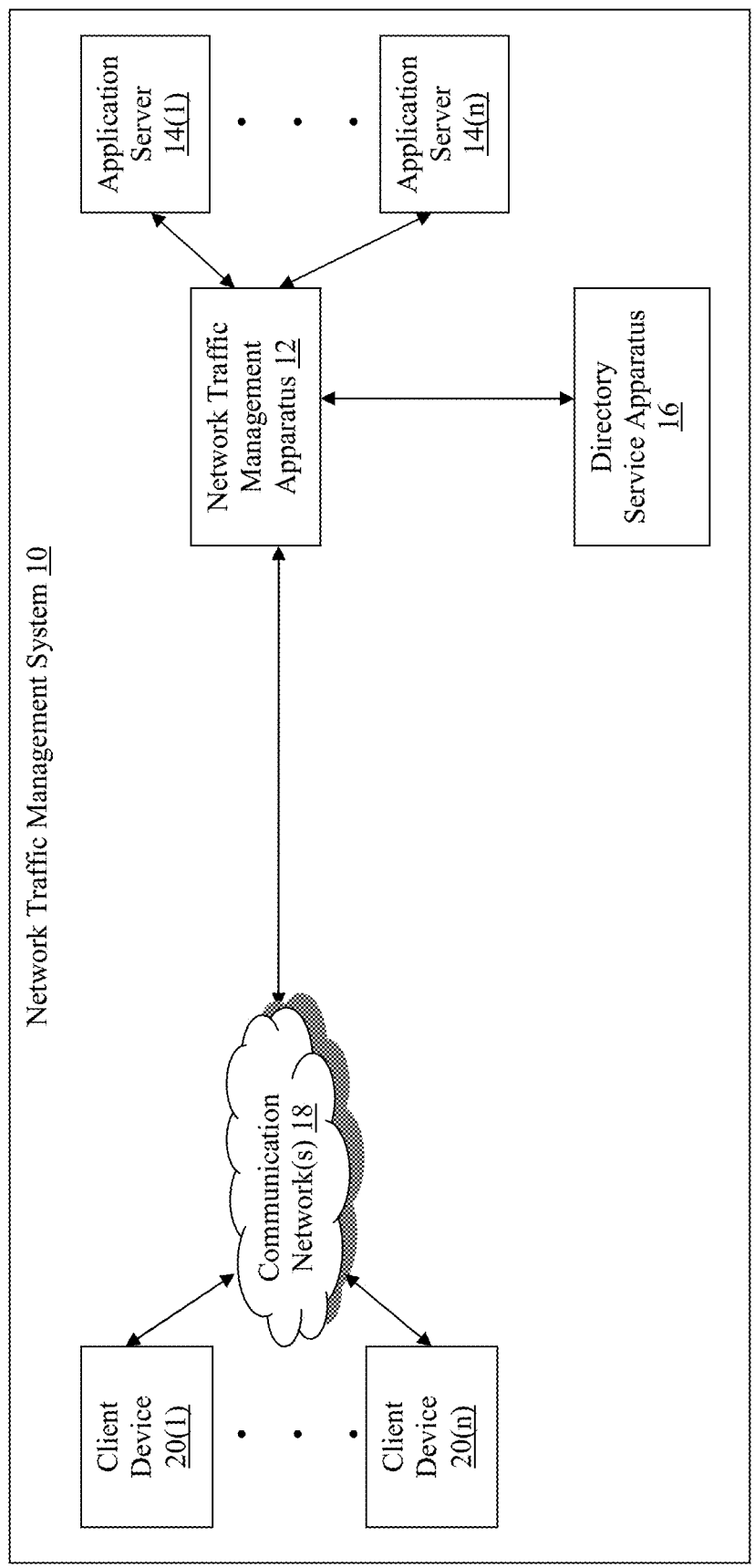
FIG. 1 is a block diagram of an exemplary network traffic management system with an network traffic management apparatus.

Referring to FIG. 1, an exemplary network environment which incorporates an exemplary network traffic management system 10 is illustrated. The network traffic management system 10 in this example includes a network traffic management apparatus 12 that is coupled to application servers 14(1)-14(n), a directory service apparatus 16, and, via communication network(s) 18, a plurality of client devices 20(1)-20(n), although the network traffic management apparatus 12, application servers 14(1)-14(n), directory service apparatus 16, and/or client devices 20(1)-20(n) may be coupled together via other topologies. The network traffic management system 10 may include other network devices such as one or more routers and/or switches, for example, which are well known in the art and thus will not be described herein. This technology provides a number of advantages including methods, non-transitory computer readable media, network traffic management systems, and network traffic management apparatuses that facilitate client certificate authentication for applications that only support password-based login.

Figure 2:
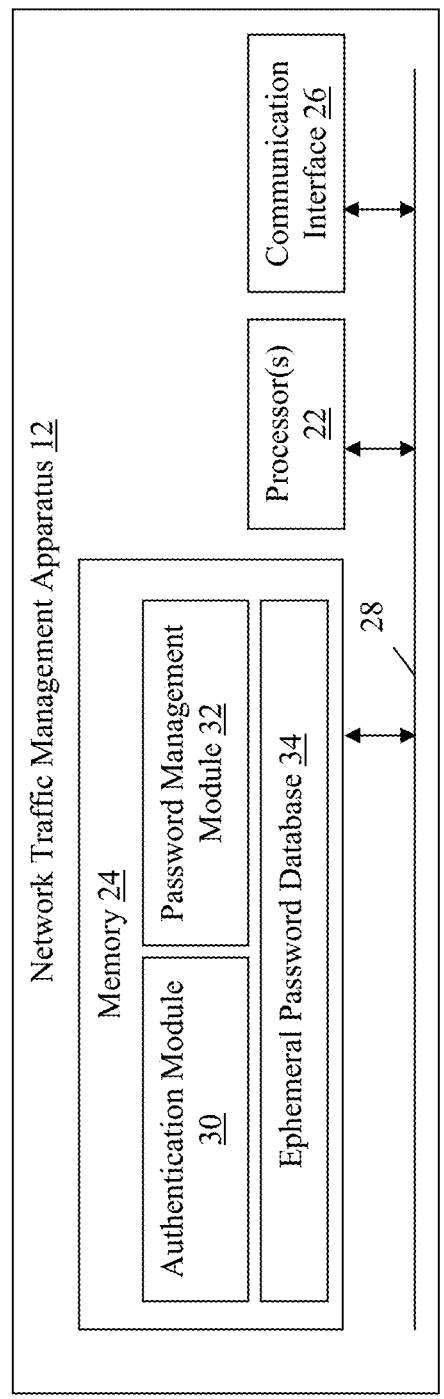
FIG. 2 is a block diagram of an exemplary network traffic management apparatus.

Referring to FIGS. 1-2, the network traffic management apparatus 12 may perform any number of functions including managing network traffic, load balancing network traffic across the application servers 14(1)-14(n), accelerating network traffic associated with web applications hosted by the application servers 14(1)-14(n), and/or providing authentication, authorization, and accounting (AAA) services, for example. The network traffic management apparatus 12 includes one or more processors 22, a memory 24, and/or a communication interface 26, which are coupled together by a bus 28 or other communication link, although the network traffic management apparatus 12 can include other types and/or numbers of elements in other configurations.

The processor(s) 22 of the network traffic management apparatus 12 may execute programmed instructions stored in the memory 24 of the network traffic management apparatus 12 for the any number of the functions identified above. The processor(s) 22 of the network traffic management apparatus 12 may include one or more CPUs or general purpose processors with one or more processing cores, for example, although other types of processor(s) can also be used.

The memory 24 of the network traffic management apparatus 12 stores these programmed instructions for one or more aspects of the present technology as described and illustrated herein, although some or all of the programmed instructions could be stored elsewhere. A variety of different types of memory storage devices, such as random access memory (RAM), read only memory (ROM), hard disk, solid state drives, flash memory, or other computer readable medium which is read from and written to by a magnetic, optical, or other reading and writing system that is coupled to the processor(s) 22, can be used for the memory 24.

Accordingly, the memory 24 of the network traffic management apparatus 12 can store one or more applications that can include computer executable instructions that, when executed by the network traffic management apparatus 12, cause the network traffic management apparatus 12 to perform actions, such as to transmit, receive, or otherwise process messages, for example, and to perform other actions described and illustrated below with reference to FIGS. 3-5. The application(s) can be implemented as modules or components of other applications. Further, the application(s) can be implemented as operating system extensions, module, plugins, or the like.

Even further, the application(s) may be operative in a cloud-based computing environment. The application(s) can be executed within or as virtual machine(s) or virtual server(s) that may be managed in a cloud-based computing environment. Also, the application(s), and even the network traffic management apparatus 12 itself, may be located in virtual server(s) running in a cloud-based computing environment rather than being tied to one or more specific physical network computing devices. Also, the application(s) may be running in one or more virtual machines (VMs) executing on the network traffic management apparatus 12. Additionally, in one or more embodiments of this technology, virtual machine(s) running on the network traffic management apparatus may be managed or supervised by a hypervisor.

In this particular example, the memory 24 of the network traffic management apparatus 12 includes an authentication module 30, a password management module 32, and an ephemeral password database 34, although the memory 24 can include other policies, modules, databases, or applications, for example. The authentication module 30 is configured to provide AAA services in response to received login requests that are received from the client devices 20(1)-20(n). In this example, the login requests include certificates (e.g., public key infrastructure (PKI) certificates) associated with a smart card login process, although the authentication module 30 can be configured to authenticate other types or number of login requests based on other protocols (e.g., RADIUS or SAML).

The password management module 32 in this example generates a temporal password subsequent to authenticating one of the client devices 20(1)-20(n) and stores the generated password in the ephemeral password database 34. The password management module 32 is further configured to extract attributes (e.g., common or user name) from a received login request and store the extracted attributes and generated password as credentials in the ephemeral password database 34 in some examples. Additionally, the password management module 32 can be configured to compare passwords or credentials received in authentication directory service requests from the application servers 14(1)-14(n) to the ephemeral password database 34 to determine whether an associated client is authenticated.

Accordingly, the ephemeral password database 34 stores passwords and/or credentials for authenticated clients with active sessions. In other examples, the ephemeral password database 34 can be a table or any other data structure configured to store generated ephemeral passwords and/or correlated credentials for clients. Advantageously, the network traffic management apparatus 12 provides certificate-based authentication on behalf of applications hosted by the application servers 14(1)-14(n), which authenticate clients using a password and directory service, as described and illustrated in more detail later.

The communication interface 26 of the network traffic management apparatus 12 operatively couples and communicates between the network traffic management apparatus 12, application servers 14(1)-14(n), directory service apparatus 16, and/or client devices 20(1)-20(n), which are all coupled together by the communication network(s) 18 or direct connections, although other types and/or numbers of communication networks or systems with other types and/or numbers of connections and/or configurations to other devices and/or elements can also be used.

By way of example only, the communication network(s) 18 can include local area network(s) (LAN(s)) or wide area network(s) (WAN(s)), and can use TCP/IP over Ethernet and industry-standard protocols, although other types and/or numbers of protocols and/or communication networks can be used. The communication network(s) 18 in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like. The communication network(s) 18 can also include direct connection(s) (e.g., for when a device illustrated in FIG. 1, such as the network traffic management apparatus 12, one or more of the client devices 20(1)-20(n), one or more of the application servers 14(1)-14(n), or one or more devices of the directory service apparatus 16 operate as virtual instances on the same physical machine).

While the network traffic management apparatus 12 is illustrated in this example as including a single device, the network traffic management apparatus 12 in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory 24, communication interface 26, or other hardware or software components of one or more other devices included in the network traffic management apparatus 12.

Additionally, one or more of the devices that together comprise the network traffic management apparatus 12 in other examples can be standalone devices or integrated with one or more other devices or apparatuses, such as one of the application servers 14(1)-14(n), for example. Moreover, one or more of the devices of the network traffic management apparatus 12 in these examples can be in a same or a different communication network including one or more public, private, or cloud networks, for example.

The directory service apparatus 16 in this example includes one or more processors, a memory, and a communication interface, which are coupled together by a bus or other communication link, although other numbers and/or types of network devices could be used. The directory service apparatus 16 can include a plurality of directory servers that are coupled to a global catalog server and, along with the global catalog server, form a synchronized directory infrastructure. The directory service apparatus 16 stores objects or records for users of the client devices 20(1)-20(n) that are authorized to access various applications hosted by the application servers 14(1)-14(n). The records are associated with a directory service, such as an active directory domain service, for example.

Each of the application servers 14(1)-14(n) in this example includes one or more processors, a memory, and a communication interface, which are coupled together by a bus or other communication link, although other numbers and/or types of network devices could be used. The application servers 14(1)-14(n) in this example process requests received from the client devices 20(1)-20(n) via the communication network(s) 18 according to the HTTP-based application RFC protocol, for example. The requests received from the client devices 20(1)-20(n) are directed to hosted applications configured to initiate authentication directory service requests to authenticate users of the client devices 20(1)-20(n) based on received credentials.

In this particular example, the applications servers 14(1)-14(n) are preconfigured to send directory service requests, including authentication requests, via the network traffic management apparatus 12, which determines whether to respond or forward the directory service requests to the directory service apparatus 16, as described and illustrated in more detail later. Various applications may be operating on the application servers 14(1)-14(n) and transmitting data (e.g., files or web pages) to the client devices 20(1)-20(n) in response to requests from the client devices 20(1)-20(n). The application servers 14(1)-14(n) may be hardware or software or may represent a system with multiple servers in a pool, which may include internal or external networks.

Although the application servers 14(1)-14(n) are illustrated as single devices, one or more actions of the application servers 14(1)-14(n) may be distributed across one or more distinct network computing devices that together comprise one or more the application servers 14(1)-14(n). Moreover, the application servers 14(1)-14(n) are not limited to a particular configuration. Thus, the application servers 14(1)-14(n) may contain a plurality of network computing devices that operate using a master/slave approach, whereby one of the network computing devices of one or more of the application servers 14(1)-14(n) operate to manage and/or otherwise coordinate operations of the other network computing devices. The application servers 14(1)-14(n) may operate as a plurality of network computing devices within a cluster architecture, a peer-to peer architecture, virtual machines, or within a cloud architecture, for example.

The client devices 20(1)-20(n) in this example include any type of computing device that can request and receive web content, such as mobile computing devices, desktop computing devices, laptop computing devices, tablet computing devices, virtual machines (including cloud-based computers), or the like. Each of the client devices 20(1)-20(n) in this example includes a processor, a memory, and a communication interface, which are coupled together by a bus or other communication link, although other numbers and/or types of network devices could be used.

The client devices 20(1)-20(n) may run interface applications, such as standard web browsers or standalone client applications, which may provide an interface to make requests for, and receive content stored on, the application servers 14(1)-14(n) via the communication network(s) 18. The client devices 20(1)-20(n) may further include a display device, such as a display screen or touchscreen, and/or an input device, such as a keyboard for example.

Although the exemplary network traffic management system 10 with the network traffic management apparatus 12, application servers 14, directory service apparatus 16, and client devices 20(1)-20(n) is described and illustrated herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the network traffic management system 10, such as the network traffic management apparatus 12, application servers 14(1)-14(n), directory service apparatus 16, or client devices 20(1)-20(n), for example, may be configured to operate as virtual instances on the same physical machine. In other words, one or more of the network traffic management apparatus 12, application servers 14(1)-14(n), directory service apparatus 16, or client devices 20(1)-20(n) may operate on the same physical device rather than as separate devices communicating through communication network(s) or other types of connections. Additionally, there may be more or fewer network traffic management apparatuses, application servers, or client devices than illustrated in the example in FIG. 1.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

The examples may also be embodied as one or more non-transitory computer readable media, which are part of the memory 24 and have instructions stored thereon for one or more aspects of the present technology, as described and illustrated by way of the examples herein. The instructions in some examples include executable code that, when executed by one or more processors (e.g., processor(s) 22), cause the processors to carry out steps necessary to implement the methods of the examples of this technology that are described and illustrated herein.

Figure 3:
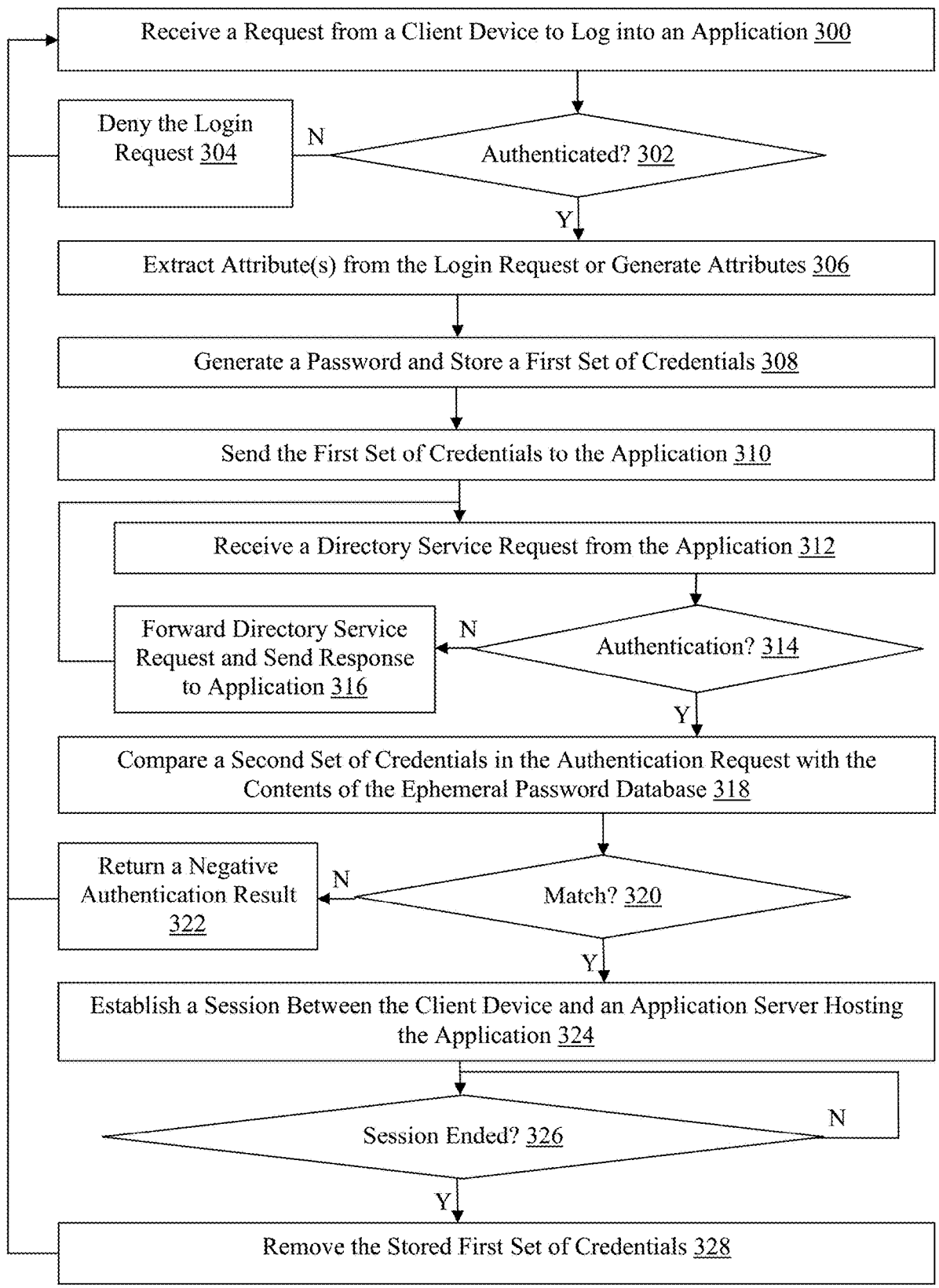
FIG. 3 is a flowchart of an exemplary method for facilitating cipher selection.

Referring more specifically to FIG. 3, a flowchart of an exemplary method for ephemeral authentication screening is illustrated. In step 300 in this example, the network traffic management apparatus 12 receives a request from one of the client devices 20(1)-20(n) to log into an application hosted by one of the application servers 14(1)-14(n). The login request can result from use of a smart card and can include a certificate (e.g., a public key infrastructure (PKI) certificate), although other types of login requests using any number of protocols (e.g., RADIUS or SAML) can also be received in step 300 in other examples.

In step 302, the network traffic management apparatus 12 determines whether a user of the one of the client devices 20(1)-20(n) from which the login request was received in step 300 is authenticated. In this example, the network traffic management apparatus 12 can authenticate the user based on the certificate included with the login request. Accordingly, the network traffic management apparatus 12 can determine whether the certificate is issued or signed by a trusted certificate authority and whether the certificate is otherwise valid, for example. If the network traffic management apparatus 12 determines that the user is not authenticated, then the No branch is taken to step 304.

In step 304, the network traffic management apparatus 12 denies the login request, such as by dropping the request or responding to the request by sending an indication that the login request was denied to the one of the client devices 20(1)-20(n) for example. However, if back in step 302 the network traffic management apparatus 12 determines that the user of the one of the client devices 20(1)-20(n) is authenticated, then the Yes branch is taken to step 306.

In step 306, the network traffic management apparatus 12 extracts one or more attributes from the login request or generates one or more attributes. In this particular example, the attribute(s) can be extracted from the certificate included in the login request and can include a user or common name or an employee ID, for example. In other examples, the network traffic management apparatus 12 can generate corresponding attribute(s) that satisfy login requirements of the application to which the login request received in step 300 is directed. Other types or number of attribute(s) can also be generated or extracted from the certificate or other portions of the login request in other examples.

In step 308, the network traffic management apparatus 12 generates a password and stores the password, optionally in the ephemeral password database 34. The password can be any random combination of characters having any level of security that complies with any requirements of the application to which the received login request is directed. In this example, the password is stored with a first set of credentials that also includes one or more of the attributes generated or extracted in step 306 (e.g., a user name).

In step 310, the network traffic management apparatus 12 sends the first set of credentials including at least the generated password to the application hosted by the one of the application servers 14(1)-14(n) and to which the login request received in step 300 is directed. The first set of credentials can be sent to the one of the application servers 14(1)-14(n) as a login request and in a manner that is expected by the application. Optionally, one or more portions of the first set of credentials can be encrypted (e.g., using a hash function) by the network traffic management apparatus 12 prior to being sent to the application.

In step 312, the network traffic management apparatus 12 receives a directory service request from the application. The one of the application servers is preconfigured to send directory service requests to the intermediary network traffic management apparatus in this example. The directory service request can be an authentication request (e.g., an LDAP bind request) or another type of directory service request (e.g., a group membership request or request for other record details for a client).

In step 314, the network traffic management apparatus 12 determines whether the directory service request is an authentication request that includes a second set of credentials in this example, including at least a password. If the network traffic management apparatus 12 determines that the directory service request is not an authentication request, then the No branch is taken to step 316.

In step 316, the network traffic management apparatus forwards the directory service request to the directory service apparatus 16. The network traffic management apparatus 12 also receives a directory service response from the directory service apparatus 16 and forwards the directory service response to the one of the application servers 14(1)-14(n). However, if the network traffic management apparatus 12 determines in step 314 that the directory service request is an authentication request, then the Yes branch is taken to step 318.

In step 318, the network traffic management apparatus 12 compares the second set of credentials included in the authentication request with the contents of the ephemeral password database 34 in this example to determine whether there is a match. If there is a match of the second set of credentials, then the network traffic management apparatus 12 effectively authenticates the client on behalf of the application and without requiring that the directory service apparatus 16 service the authentication request. In this example, the network traffic management apparatus 12 first decrypts the second set of credentials prior to querying the ephemeral password database 34.

If the network traffic management apparatus 12 determines in step 320 that there is not a match of the second set of credentials in the ephemeral password database, then the No branch is taken to step 322. In step 322, the network traffic management apparatus 12 returns a negative authentication result to the application indicating that the authentication request is denied.

However, if in step 320 the network traffic management apparatus 12 determines that there is a match of the second set of credentials in the ephemeral password database, then the Yes branch is taken to step 324. In step 324, the network traffic management apparatus 12 returns a positive authentication result to the application and establishes a session to facilitate communications between the one of the client devices 20(1)-20(n) and the application hosted by the one of the application servers 14(1)-14(n).

In step 326, the network traffic management apparatus 12 determines whether the established session has ended. Accordingly, the network traffic management apparatus 12 in this example monitors the session between the one of the client devices 20(1)-20(n) and the one of the application servers 14(1)-14(n) to determine whether the user has logged off, whether the session has timed out, or whether the session has expired, for example, although the determination regarding whether the session has ended can be based on other criteria in other examples.

If the network traffic management apparatus 12 determines that the session has not ended, then the No branch is taken back to step 326 and the network traffic management apparatus 12 effectively continues to monitor the session and wait for a determination that the session has ended. However, if the network traffic management apparatus 12 determines that the session has ended, then the Yes branch is taken to step 328.

In step 328, the network traffic management apparatus 12 optionally deletes or removes the first set of credentials, including at least the password generated in step 308, from the ephemeral password database 34. By removing the first set of credentials, the network traffic management apparatus 12 can ensure that the password generated in step 308 cannot be used (e.g., by a malicious third party) without a subsequent prior authentication. Subsequent to removing the first set of credentials, the network traffic management apparatus 12 proceeds back to step 300, and one or more of steps 300-328 can be performed in parallel by the network traffic management apparatus 12 for any number of the client devices 20(1)-20(n).

Figure 4:
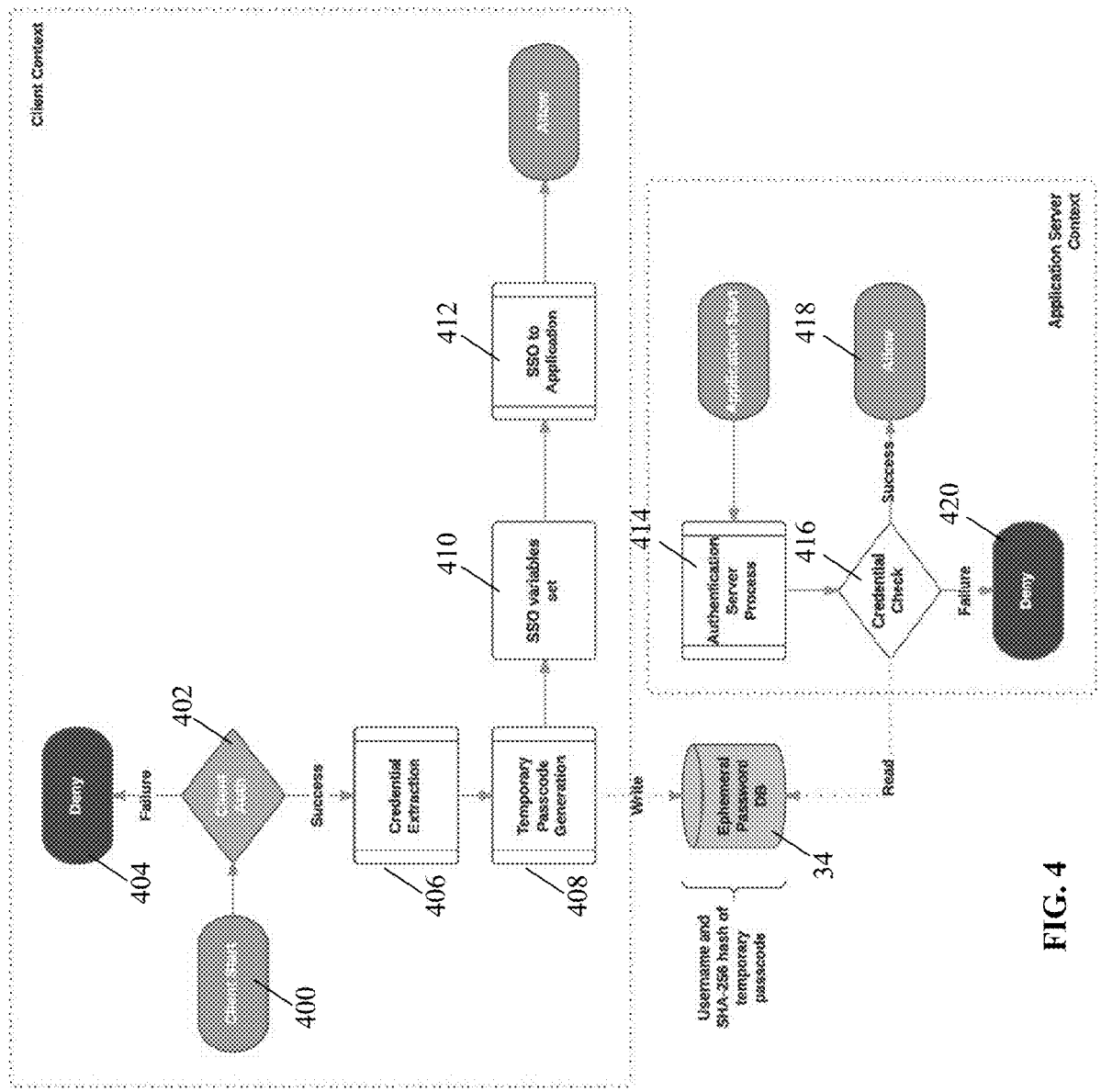
FIG. 4 is a set of diagrams illustrating custom selection rules for selecting cipher suites to be included in a cipher string.

Referring more specifically to FIG. 4, a flow diagram of an exemplary method for ephemeral authentication screening is illustrated. In step 400 in a client context in this example, one of the client devices 20(1)-20(n) sends a login request. In step 402, the network traffic management apparatus 12 intercepts the login request and attempts to authenticate the client from which the login request originated. If the network traffic management apparatus cannot authenticate the client in step 402, then the failure branch is taken to step 404 in which the login request is denied, and a message indicating denial of the login request is optionally sent to the one of the client devices 20(1)-20(n) by the network traffic management apparatus 12.

However, if the network traffic management apparatus 12 can authenticate the client in step 402, then the success branch is taken to step 406. In step 406, the network traffic management apparatus 12 preforms a credential extraction by extracting attribute(s) from the login request (e.g., a common name from a certificate included with the login request).

In step 408, the network traffic management apparatus generates a temporary or ephemeral passcode or password for the client. The network traffic management apparatus 12 also stores a first set of credentials including those extracted in step 406 and the generated password in an ephemeral password database 34, optionally using a hash of the generated password.

In step 410 in the client context, the network traffic management apparatus 12 sets single sign on (SSO) variables in this example, including the first set of credentials. In step 412, the network traffic management apparatus 12 sends the SSO variables as a login request to an application indicated in the login request sent by the one of the client devices 20(1)-20(n) in step 400, thereby allowing communication of a login request by the authenticated one of the client devices 20(1)-20(n) to one of the application servers 14(1)-14(n) hosting the application.

In step 414 in an application server context, the one of the application servers 14(1)-14(n) hosting the application begins an authentication server process in response to a received SSO login request. The authentication server process includes initiating an authentication directory service request. In step 416, the network traffic management apparatus 12 performs a credential check by first intercepting the authentication request. Next, the network traffic management apparatus 12 reads or queries the ephemeral password database 34 to determine whether there is a match in the ephemeral password database 34 of a second set of credentials included in the authentication request, which correspond to SSO variables received by the one of the application servers 14(1)-14(n) in a login request (e.g., as sent in step 412).

If the network traffic management apparatus 12 identifies a match of the second set of credentials in the ephemeral password database 34, then the success branch is taken from the step 416 to step 418. In step 418, the network traffic management apparatus 12 sends a positive authentication result to the one of the application servers 14(1)-14(n) and establishes a session between the one of the client devices 20(1)-20(n) and the one of the application servers 14(1)-14(n) for communicating with the hosted application.

However, if the network traffic management apparatus 12 does not identify a match of the second set of credentials in the ephemeral password database 34 in step 416, then the failure branch is taken to step 420. In step 420, the network traffic management apparatus 12 denies the authentication request, such as by sending a negative authentication result to the one of the application severs 14(1)-14(n).

Figure 5:
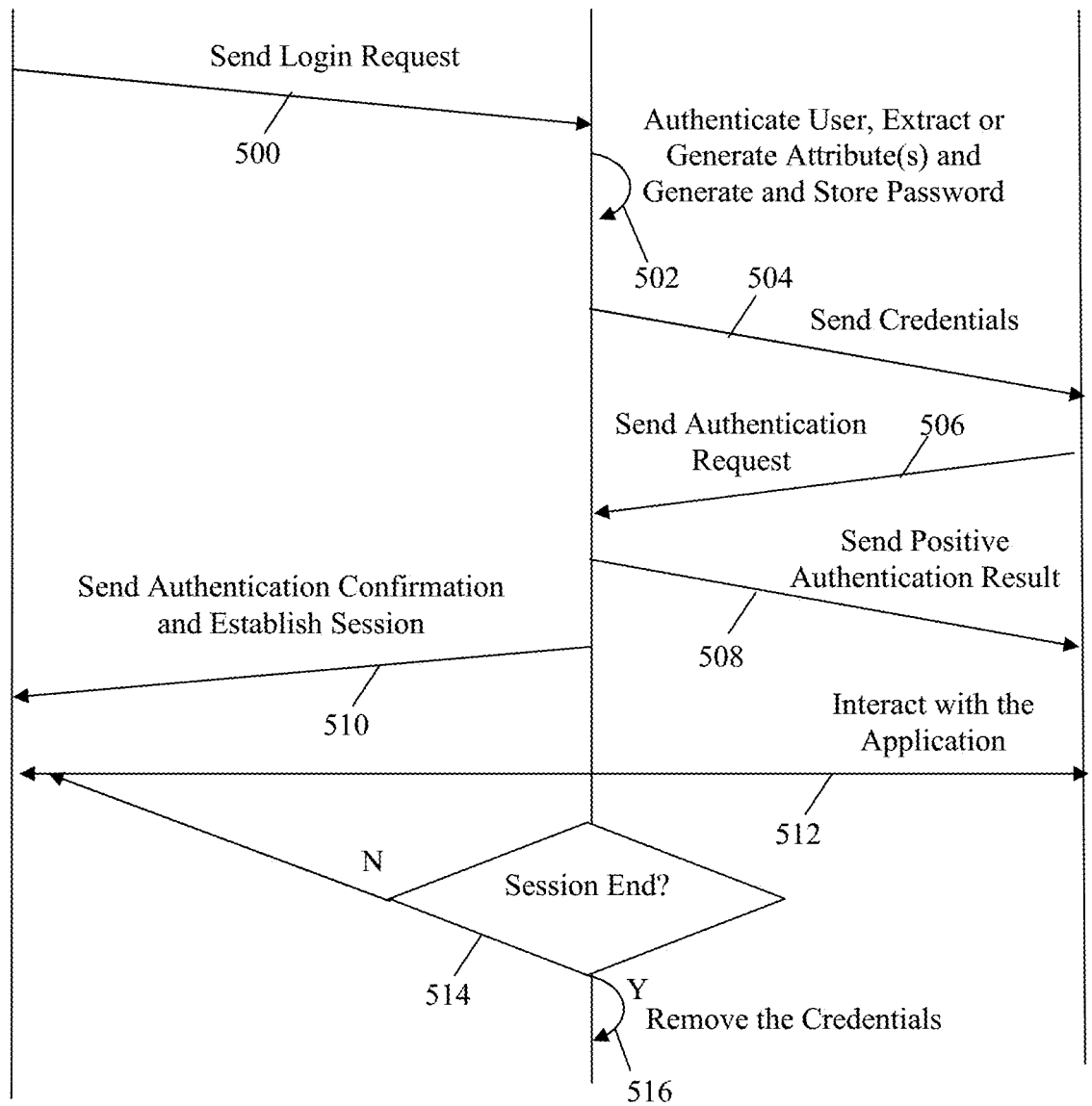
FIG. 5 is an exemplary interface for obtaining custom selection rules and outputting a result set as a cipher string.

Referring more specifically to FIG. 5, a timing diagram of an exemplary method for ephemeral authentication screening is illustrated. In step 500 in this example, the client device 20 sends a login request to toward an application hosted by the application server 14, which is intercepted by the network traffic management apparatus 12. The login request can be initiated using a smart card and can include a certificate, for example, although other types of login requests initiated in other ways can also be sent by the client device.

In step 502, the network traffic management apparatus 12 authenticates a user of the client device 20, extracts attribute(s) from the login request (e.g., from a certificate included therewith), or generates attribute(s), generates a password, and stores the password locally in the ephemeral password database 34. The network traffic management apparatus 12 can perform a client certificate authentication, for example, although other types of authentication can also be performed. In another example in which the user cannot be authenticated, the network traffic management apparatus 12 can respond to the client device 20 with a denial of the login request and/or drop the login request, for example.

In step 504, the network traffic management apparatus 12 sends a first set of credentials for the user of the client device 20 to the application server 14. The credentials include at least the password generated, and optionally include one or more of the attribute(s) extracted or generated, in step 502. The credentials can be sent as a login request to the application in a format and manner that complies with the requirements and/or expectations of the application.

In step 506, the application server 14 sends an authentication request, which is intercepted or otherwise received by the network traffic management apparatus 12. The authentication request includes a second set of credentials. Following receipt of the authentication request, the network traffic management apparatus 12 determines whether there is a match of the second set of credentials in the ephemeral password database 34. In this example, the second set of credentials corresponds with the first set of credentials stored in the ephemeral password database in step 502.

Accordingly, the network traffic management apparatus 12 will determine that there is a match of the second set of credentials in the ephemeral password database 34 and, in step 508, will send a positive authentication result to the application server 14 in response to the authentication request. In another example in which the second set of credentials are not stored in the ephemeral password database 34, the network traffic management apparatus can send a negative authentication result to the application server 14.

In step 510, the network traffic management apparatus 12 sends a positive authentication result to the client device 20 in response to the login request received by the network traffic management apparatus 12 in step 500. In another example, step 510 can be performed at any time subsequent to the authentication of the user of the client device 20 in step 502.

In step 512, the client device 12 interacts with the application hosted by the application server 14 via the session established in step 510.

In step 514, the network traffic management apparatus 12 determines whether the session has ended based on a monitoring of the communications between the client device 20 and application server 14 exchanged in step 512. If the network traffic management apparatus 12 determines that the session has not ended, then the No branch is taken and the network traffic management apparatus 12 continues monitoring the session.

However, if the network traffic management apparatus 12 determines that the session has ended, then the Yes branch is taken to step 516. In step 516, the network traffic management apparatus 12 removes the first set of credentials, including at least the password generated in step 502, from the ephemeral password database 14.

With this technology, network traffic management apparatuses can facilitate authentication for applications that require password-based authentication but reside in networks that restrict password use. Advantageously, client certificate authentication, for example, can be used as a proxy for password-based authentication utilized by legacy and other applications in order to maintain user access to those applications.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. An authentication method implemented by a network traffic management system comprising one or more network traffic management apparatuses or application servers, the method comprising:

generating a first credential for a client authenticated without using password-based authentication after intercepting a first login request from the client, wherein the first login request is directed to an application configured to perform password-based authentication;

sending at least a representation of at least a portion of the first credential in a second login request to the application;

determining when an intercepted directory request is a directory service authentication request from the application to a directory service;

extracting a second credential from the intercepted directory request, when the determination indicates the intercepted directory request is the directory service authentication request; and determining when the directory service authentication request is valid based on correlating the extracted second credential and the at least a portion of the first credential, wherein when the determination indicates the directory service authentication request is valid:

returning a positive authentication result to the application in response to the directory service authentication request and without communicating with the directory service; and exchanging network communications via a connection between the client and the application.

2. The authentication method of claim 1, further comprising forwarding the intercepted directory request to the directory service, when the determination indicates the intercepted directory request is not the directory service authentication request.

3. The authentication method of claim 1, wherein the representation of the at least a portion of the first credential comprises the first credential or a value associated with the first credential.

4. The authentication method of claim 1, wherein the directory request is intercepted by one of the network traffic management apparatuses that comprises the directory service and is disposed between the client and the application.

5. The authentication method of claim 1, further comprising:

storing the first credential in a local ephemeral password database associated with one or more attributes for the client extracted from the login request, wherein the one or more attributes are included in the second login request and the directory service authentication request;

monitoring the connection to determine when a session associated with the client has ended; and removing the first credential from the ephemeral password database, when the determination indicates that the session associated with the client has ended.

6. A network traffic management apparatus, comprising memory comprising programmed instructions stored thereon and one or more processors configured to be capable of executing the stored programmed instructions to:

generate a first credential for a client authenticated without using password-based authentication after intercepting a first login request from the client, wherein the first login request is directed to an application configured to perform password-based authentication;

send at least a representation of at least a portion of the first credential in a second login request to the application;

determine when an intercepted directory request is a directory service authentication request from the application to a directory service;

forward the intercepted directory request to the directory service, when the determination indicates that the intercepted directory request is not a directory service authentication request;

extract a second credential from the intercepted directory request, when the determination indicates the intercepted directory request is the directory service authentication request; and determine when the directory service authentication request is valid based on correlating the extracted second credential and the at least a portion of the first credential, wherein when the determination indicates the directory service authentication request is valid:
  return a positive authentication result to the application in response to the directory service authentication request and without communicating with the directory service; and
  exchange network communications via a connection between the client and the application.

7. The network traffic management apparatus of claim 6, wherein the one or more processors are further configured to be capable of executing the stored programmed instructions to forward the intercepted directory request to the directory service, when the determination indicates the intercepted directory request is not the directory service authentication request.

8. The network traffic management apparatus of claim 6, wherein the representation of the at least a portion of the first credential comprises the first credential or a value associated with the first credential.

9. The network traffic management apparatus of claim 6, wherein the network traffic management apparatus comprises the directory service and is disposed between the client and the application.

10. The network traffic management apparatus of claim 6, wherein the one or more processors are further configured to be capable of executing the stored programmed instructions to:
  store the first credential in a local ephemeral password database associated with one or more attributes for the client extracted from the login request, wherein the one or more attributes are included in the second login request and the directory service authentication request;
  monitor the connection to determine when a session associated with the client has ended; and
  remove the first credential from the ephemeral password database, when the determination indicates that the session associated with the client has ended.

11. A non-transitory computer readable medium having stored thereon instructions for authentication comprising executable code which when executed by one or more processors, causes the one or more processors to:
  generate a first credential for a client authenticated without using password-based authentication after intercepting a first login request from the client, wherein the first login request is directed to an application configured to perform password-based authentication;
  send at least a representation of at least a portion of the first credential in a second login request to the application;
  determine when an intercepted directory request is a directory service authentication request from the application to a directory service;
  forward the intercepted directory request to the directory service, when the determination indicates that the intercepted directory request is not a directory service authentication request;
  extract a second credential from the intercepted directory request, when the determination indicates the intercepted directory request is the directory service authentication request; and
  determine when the directory service authentication request is valid based on correlating the extracted second credential and the at least a portion of the first credential, wherein when the determination indicates the directory service authentication request is valid:
    return a positive authentication result to the application in response to the directory service authentication request and without communicating with the directory service; and
    exchange network communications via a connection between the client and the application.

12. The non-transitory computer readable medium of claim 11, wherein the executable code when executed by the one or more processors further causes the one or more processors to forward the intercepted directory request to the directory service, when the determination indicates that the intercepted directory request is not a directory service authentication request.

13. The non-transitory computer readable medium of claim 11, wherein the representation of the at least a portion of the first credential comprises the first credential or a value associated with the first credential.

14. The non-transitory computer readable medium of claim 11, wherein the directory request is intercepted by a network traffic management apparatus that comprises the directory service and is disposed between the client and the application.

15. The non-transitory computer readable medium of claim 11, wherein the executable code when executed by the one or more processors further causes the one or more processors to:
  store the first credential in a local ephemeral password database associated with one or more attributes for the client extracted from the login request, wherein the one or more attributes are included in the second login request and the directory service authentication request;
  monitor the connection to determine when a session associated with the client has ended; and
  remove the first credential from the ephemeral password database, when the determination indicates that the session associated with the client has ended.

16. A network traffic management system, comprising one or more network traffic management apparatuses or application servers with memory comprising programmed instructions stored thereon and one or more processors configured to be capable of executing the stored programmed instructions to:
  generate a first credential for a client authenticated without using password-based authentication subsequent to intercepting a first login request from the client, wherein the first login request is directed to an application configured to perform password-based authentication;
  send at least a representation of at least a portion of the first credential in a second login request to the application;
  determine when an intercepted directory request is a directory service authentication request, wherein the directory request is intercepted from the application and is directed to a directory service;
  forward the intercepted directory request to the directory service, when the determination indicates that the intercepted directory request is not a directory service authentication request;
  extract a second credential from the directory request, when the determination indicates that the directory request is a directory service authentication request; and determine when the directory service authentication request is valid based on correlating the extracted second credential and the at least a portion of the first credential, when the determination indicates that the directory service authentication request is valid:
return a positive authentication result to the application in response to the directory service authentication request and without communicating with the directory service; and
exchange network communications via a connection between the client and the application.

17. The network traffic management system of claim 16, wherein the one or more processors are further configured to be capable of executing the stored programmed instructions to forward the intercepted directory request to the directory service, when the determination indicates the intercepted directory request is not the directory service authentication request.

18. The network traffic management system of claim 16, wherein the representation of the at least a portion of the first credential comprises the first credential or a value associated with the first credential.

19. The network traffic management system of claim 16, wherein the directory request is intercepted by one of the network traffic management apparatuses that comprises the directory service and is disposed between the client and the application.

20. The network traffic management system of claim 16, wherein the one or more processors are further configured to be capable of executing the stored programmed instructions to:
store the first credential in local ephemeral password database associated with one or more attributes for the client extracted from the login request, wherein the one or more attributes are included in the second login request and the directory service authentication request;
monitor the connection to determine when a session associated with the client has ended; and
remove the first credential from the ephemeral password database, when the determination indicates that the session associated with the client has ended.

* * * * *